United States Patent [19]

Yoshida et al.

[11] Patent Number: 4,988,246

[45] Date of Patent: Jan. 29, 1991

[54] APPARATUS FOR INDICATING INCOMPLETE AND COMPLETE FASTENING OF SCREW COMPONENTS

[75] Inventors: Minoru Yoshida, Yamato; Teruo Arai, Tokyo; Toshiro Ishikawa, Yamato; Masaji Shimada, Tokyo; Shigeru Susaki, Yokohama; Yukihiko Yamada, Yamato; Hisao Ohta, Tokyo; Katsuyoshi Nagami, Ebina; Kazutami Hayajiri, Yamato; Takaharu Yoshioka, Sagamihara; Shigo Hirai, Yamato; Tosio Ichida, Ashigarakami; Nobuyuki Ishii, Tokyo, all of Japan

[73] Assignee: Kyodo Electric Co., Ltd., Tokyo, Japan

[21] Appl. No.: 483,822

[22] Filed: Feb. 23, 1990

[30] Foreign Application Priority Data

Mar. 17, 1989 [JP] Japan ............................. 1-31032[U]
May 19, 1989 [JP] Japan ............................. 1-58239[U]

[51] Int. Cl.5 ............................................. F16B 31/02
[52] U.S. Cl. ....................................... 411/10; 411/14; 116/DIG. 34
[58] Field of Search ....................................... 411/9–11, 411/13, 14, 544; 116/DIG. 34

[56] References Cited

U.S. PATENT DOCUMENTS

| | | |
|---|---|---|
| 3,469,492 | 9/1969 | Dahl .................................... 411/11 |
| 3,504,591 | 4/1970 | Christophersen . |
| 3,561,317 | 4/1969 | Rowell . |
| 3,948,141 | 4/1976 | Shinjo . |
| 4,020,734 | 5/1977 | Bell . |
| 4,303,001 | 12/1981 | Trungold . |
| 4,322,193 | 3/1982 | Stahl .................................... 411/11 |
| 4,483,648 | 11/1984 | Trungold . |

FOREIGN PATENT DOCUMENTS 48-28992 9/1973 Japan .
51-44830 10/1976 Japan .
63-158613 10/1988 Japan .

Primary Examiner—Neill R. Wilson

[57] ABSTRACT

Apparatus for indicating incomplete and complete fastening of a screw includes a washer and a ring of a generally flat synthetic resin sheet. The washer includes a pair of washer portions of a generally flat, round shape and a joint portion interconnecting the washer portions to face them in opposite directions to enable the washer portions to receive a shank of a screw in the openings thereof. The lengthwise section of the joint portion forms generally a U shape. The ring is made of a generally round, deformable material and is inserted between the pair of washer portions thus facing each other. The deformable material is expanded radially outward, when compressed by the washer portions receiving the shank of the screw when fastened. Upon the compressive force reaching a predetermined value, the ring will be broken due to the pair of washer portions overlaying one another.

12 Claims, 6 Drawing Sheets

APPARATUS FOR INDICATING INCOMPLETE AND COMPLETE FASTENING OF SCREW COMPONENTS

BACKGROUND OF THE INVENTION

1. Field of the Invention

The present invention relates to an apparatus for indicating whether the screw components, such as bolts and nuts, are fastened incompletely or completely.

2. Description of the Prior Art

Connecting work of electric conductors, assembling work of equipment, construction work, and other works are often accompanied with fastening work using bolts and nuts. In those works, bolts and nuts left unfastened due to carelessness of workers and rough work, or insufficiently fastened due to negligence for a long time after temporary fastening with bare hands may develop critical failure. In order to eliminate such failure, the following prior art has been proposed.

In the Japanese utility model publication No. 28992/1973, for example, there is disclosed a bolt assembly which has a fastener head. The fastener head has a stress concentrating portion in the axial extension (longitudinal direction) of a bolt which has been mounted on the bolt head through the stress concentrating portion in a detachable manner. When the bolt is screwed by the fastener head with a tool and attained the predetermined torque, the stress concentrating portion is destroyed to separate the fastener head. Incompleteness and completeness of fastening are indicated by whether or not the fastener head exists on the bolt head.

Also, in the Japanese utility model publication No. 44830/1976, there is disclosed a twin headed member having a stress concentrating portion formed by providing cuts from the perimeter on the middle part of the axial extension. When one head of the twin headed member is fitted in the bolt head and the bolt is rotated by the other head with a tool, the stress concentrating portion is broken at the predetermined torque.

In both structures of the prior art, however, since a head to be first rotated with a tool and a stress concentrating portion to be broken at the predetermined torque are positioned on the axial extension of the bolt, the height of the bolt head increases toward the axial extension of the bolt at least by the sum of each height of the head to be rotated with a tool and the stress concentrating portion, and as a result, space to be occupied with the bolt head increases. Consequently, in a working place where there is no space in the altitudinal direction of the bolt head, the structures of the prior art will cause such an inconvenience as impossibility of mounting bolts.

In addition, since those structures disclosed in the above-mentioned Japanese utility model publications have been invented only for application to bolts, the structures are not applicable to nuts.

SUMMARY OF THE INVENTION

It is, therefore, an object of the present invention to provide, for removing those inconveniences found in the prior art, an indicator capable of indicating incomplete and complete fastening of screw components and providing the fastened portion with sealability, using conventional bolts.

In accordance with the present invention, apparatus for indicating incomplete and complete fastening of screw components comprises a washer member consisting of a generally flat sheet of material which has a first opening of a size sufficient to receive the shank of the screw components as well as prevent said screw components from passing through said first opening, and a ring member consisting of a generally flat synthetic resin sheet of material which has a second opening of a size sufficient to receive the shank of said screw components as well as prevent said screw components from passing through said second opening. Said washer member comprises a pair of washers each of which has a generally flat, round external shape with an outside diameter at least equal to that of the screw components and has the first opening provided almost on the center thereof, and a joint portion which interconnects the pair of washers to face them in opposite directions so that each of the first opening of the washers can equally receive the shank of the screw components. The longitudinal cross section of the joint portion which is substantially perpendicular in the axial extension (longitudinal direction) of said shank forms generally a U-shape when said washer member receives the screw components in the first opening. The afore-mentioned ring member comprises a generally circular deformable material and has been inserted into the pair of washers. The outside diameter of said generally circular material is substantially larger than that of either one of the pair of washers. Said deformable material is lengthened radially in an outward direction, when it is compressed with the pair of washers after the shank of the screw components is received in the first and second openings and said screw components are fastened. When the compressive force reaches a predetermined value, said ring member is destroyed due to overlapping of the pair of washers.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The objects and features of the present invention will become more apparent from the consideration of the following detailed description taken in conjunction with the accompanying drawings which are given by way of illustration only, and thus are not limitative of the present invention and in which.

DESCRIPTION OF THE PREFERRED EMBODIMENTS

Figure 1:
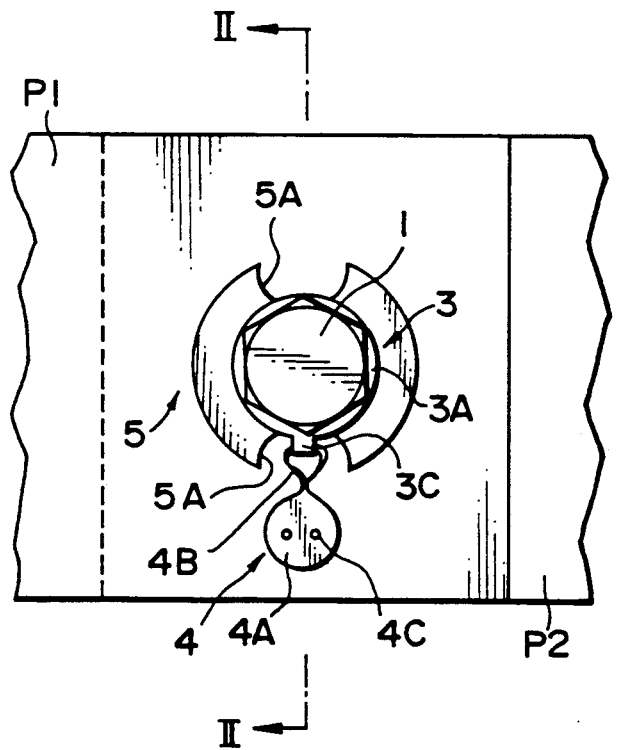
FIG. 1 is a front view illustrating an embodiment of an apparatus for indicating incomplete and complete fastening of screw components in accordance with the present invention prior to fastening.
Figure 2:
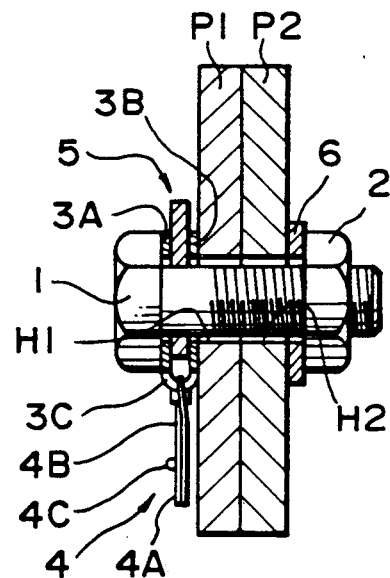
FIG. 2 is a lateral sectional view taken along alternate long and short dash line II—II of FIG. 1.
Figure 5A:
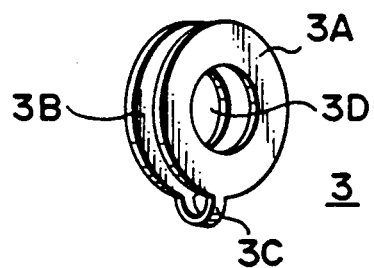
FIGS. 5A and 5B are perspective views illustrating washers to be used for the embodiment shown in FIG. 1.
Figure 5B:
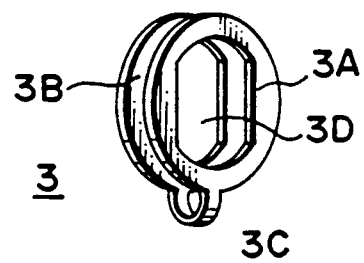
Figure 6:
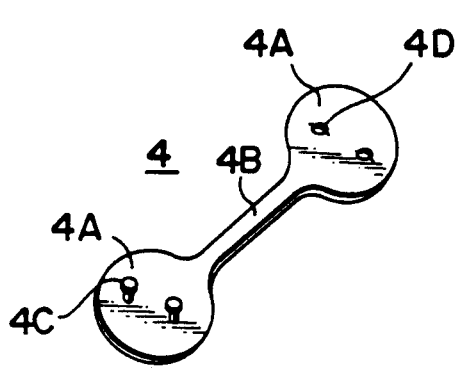
FIG. 6 is a perspective view illustrating an indicator member to be used for the embodiment shown in FIG. 1.

Referring to FIGS. 1, 2, 3, and 4, there is shown an application of the present invention in the portion where two boards P1 and P2 are to be overlapped and fastened with a bolt and a nut. FIG. 1 is a front view illustrating the embodiment prior to fastening and FIG. 2 is the vertical sectional view of the embodiment where there are shown the boards P1 and P2 whose bolt through-holes H1 and H2 are coincided with each other and then threaded with a bolt 1 on which a nut 2 is screwed. Washers 3 and an elastic synthetic resin ring 5 are inserted between the bearing surface of the head portion of the bolt 1 and one board P1, while a washer 6 is inserted between the bearing surface of the nut 2 and the other board P2. The washers 3, as shown in FIGS. 5A and 5B, the upper washer portion 3A and the lower washer portion 3B of a pair of washers 3 are joined integrally with a joint portion 3C to form the lateral section into a generally U-shape. The elastic synthetic resin ring 5 is inserted into a space between the pair of washer portions 3A and 3B. The joint portion 3C of the washers 3 has an indicator member 4, as shown in FIG. 6, suspended thereon for confirmation of fastening.

Figure 8:
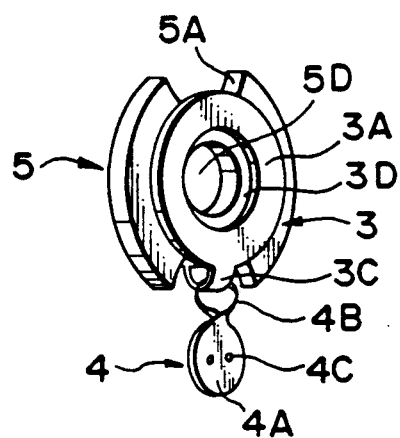
FIG. 8 is a perspective view illustrating a ring which has been interposed between washers assembled with the indicator member.

Each diameter of the bolt through-holes H1 and H2 on the boards P1 and P2 and the hole on the center of the washer 6 is slightly larger than the outside diameter of a general bolt 1 to provide a gap between each hole and the bolt 1. The washers 3 shown in FIG. 5A have generally round openings 3D of slightly larger diameter on the upper washer portion 3A and the lower washer portion 3B than the outside diameter of the bolt 1. The washers 3 shown in FIG. 5B have generally oval openings 3D. A part of each perimeter of the upper washer portion 3A and the lower washer portion 3B of the washers 3 is joined integrally with the joint 3C to form the lateral section into a generally U-shape. Each outside diameter of the upper washer portion 3A and the lower washer portion 3B of the washers 3 is generally equal to or larger than that of the head portion of the bolt 1. The joint portion 3C is projected out of the bearing surface of the screw components. The indicator member 4 shown in FIG. 6 has generally round indicator boards 4A—4A integrally provided on both ends of an engaging portion 4B to be engaged with the joint 3C of the washers 3. On one indicator board 4A there are formed protrusions 4C, while on the other indicator board 4B there are formed holes 4D. When the indicator member 4 is mounted on the washers 3, the protrusions 4C are fitted in the holes 4D as shown in FIG. 8.

Instead of the fitting means, alternative means, such as fasteners having male and female surfaces, may be used. It is optional to use those members made of either plastic or metal sheet in proper shape and size. In the illustrative application, the indicator boards 4A—4A have been formed integrally with the engaging portion 4B. However, those indicator boards may be formed and fitted to the washers 3 as discrete members in a proper means. As for the indicator member 4, it is desirable to use colored one for easy visual confirmation.

Figure 7:
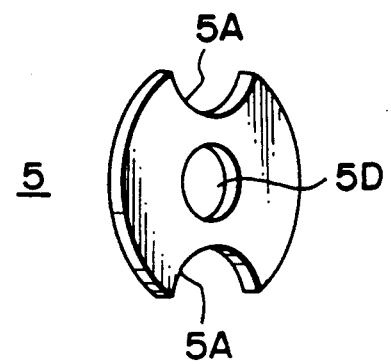
FIG. 7 is a perspective view illustrating an elastic synthetic resin ring to be used for the embodiment shown in FIG. 1.

In FIG. 7, there is shown an illustration of the elastic synthetic resin ring 5 of which the outside diameter is larger than that of the upper washer 3A of the washers 3 and the inside diameter is a size substantially fit to the shank of the bolt 1. The suitable material for the ring 5 is, for example, silicone rubber, while other synthetic resin materials that have elasticity suitable for attainment of the objects of the present invention may be used. As for the ring 5, it is desirable to use colored one for easy visual confirmation. It is recommended to select a color for the ring 5 different from the one for the indicator member 4.

To make it possible to break the elastic synthetic resin ring 5 when the fastening pressure of the bolt 1 and the nut 2 reaches the predetermined value, parameters, such as size and shape for the openings 3D provided on the upper and lower washer portions 3A and 3B of the washers 3, should be properly designed, or such materials which have elasticity desired for the ring 5 should be selected, or the shape and thickness of the ring 5 should be properly designed. In the illustration thereof, the ring 5 has generally radial cuts 5A formed on a plurality of portions of the perimeter. The intensity of fastening pressure required for breaking the ring 5 varies depending on the shape, number, or depth of the cuts 5A. The cuts 5A may be formed on the internal perimeter or both external and internal perimeters of the ring 5.

The assembly consisting of the washers 3 with the indicator member 4 and the ring 5 may be fitted in the shank of the bolt 1 as they are in a state of being separated with each other. As shown in FIG. 8, to assemble the washers 3 integrally with the ring 5 beforehand by retaining the ring 5 inserted between the upper and lower washer portions 3A and 3B of the washers 3 or glueing ring 5 to either the upper washer portion 3A or the lower washer portion 3B makes it possible to stably position the ring 5 inwardly on the joint portion 3C of the washers 3, since the indicator member 4 retains the position of the ring 5, resulting in easy handling. When it is necessary to discriminate the upper washer portion 3A from the lower washer portion 3B, it is recommended to make a difference in outside diameter between the upper and lower washer portions or select different colors for each other for further convenience.

Figure 3:
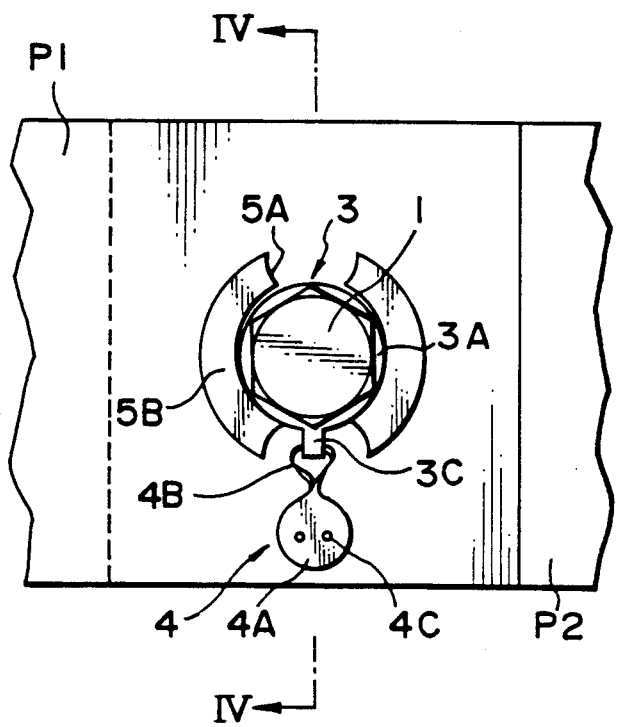
FIG. 3 is a front view, similar to FIG. 1, illustrating the embodiment shown in FIG. 1 after fastening has been completed.

When the nut 2 is rotated to increase fastening under the state shown in FIGS. 1 and 2, the upper washer portion 3A of the washers 3 is pressed against the bearing surface of the head portion of the bolt 1 and subsequently the portion, which has been interposed between the upper and lower washers 3A and 3B of the washers 3, of the elastic synthetic resin ring 5 located inside the washers 3 is compressed to be lengthened radially. When the fastening pressure reaches the roughly predetermined value, the upper and lower plate portions 3A and 3B of the washers 3 are brought almost in contact with each other, leaving the joint portion 3C where the indicator member 4 has been fitted. As a result, the compressed and fastened portion of the ring 5 is broken inwardly and outwardly. Under the state of the ring 5 being broken as shown in FIG. 3, an inward broken piece 5C of the ring 5 comes off between the upper and lower washer portions 3A and 3B of the washers 3, and as a result, the broken piece 5C makes inroads into a gap between the bolt 1 and the openings 3D on the upper and lower washer portions 3A and 3B as shown in FIG. 5A and the through-hole H1 of the workpiece P1.

Simultaneously, the outwardly broken piece 5B is a product produced as the result of the portion of the ring 5 interposed between the upper and lower washer portions 3A and 3B of the washers 3 being pushed out of the overlapped portion of the upper and lower plate portions 3A and 3B of the washers 3. More specifically, because the internal perimeter of the ring 5 is lengthened, tensile stress is concentrated on the portion of the ring 5 narrowed by the cuts 5A to cause breakage as shown in FIG. 3. The outwardly broken piece 5B can be easily removed by hand, since it comes to be in a state of being hooked on the external perimeter of the overlapped portion of the upper and lower washer portions 3A and 3B of the washers 3.

Figure 4:
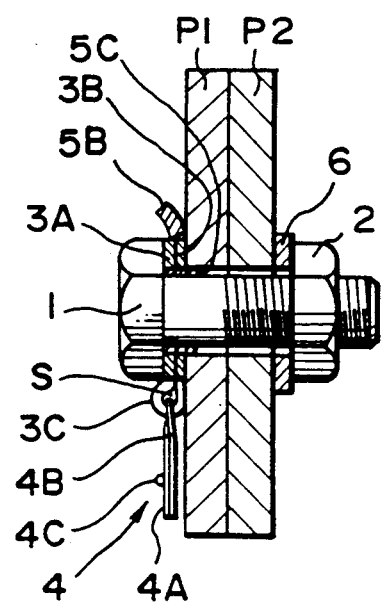
FIG. 4 is a lateral sectional view taken along alternate long and short dash line IV—IV of FIG. 3.

Under the above-mentioned state of fastening, as the joint portion 3C of the washers 3 is placed on the location protruded radially in an outward direction to the bearing surface of the head portion of the bolt 1, a gap S is formed inside the apex of the joint portion 3C as shown in FIG. 4. Consequently, the engaging portion 4B of the indicator member 4 fitted to the joint portion 3C maintains the initial condition of the indicator member 4 being first fitted thereto without receiving the fastening pressure.

In the above-mentioned illustrative embodiment of the present invention, fastening has been made by rotating the nut 2. However, in case that the head side of the bolt 1 is fastened by the nut 2 held with a holding tool, the upper and lower washer portions 3A and 3B are fitted in the shank of the bolt 1 in a form being integrated with the joint portion 3C. Consequently, the friction resistance of the bearing surface of the head portion of the bolt 1 caused by a single rotation of the bolt 1 is not transmitted to the elastic synthetic resin ring 5 interposed between the upper and lower washer portions 3A and 3B. Thus, the ring 5 receives even distribution of the fastening pressure on the entire perimeter without being twisted and is broken at the predetermined fastening pressure.

Also in the illustrative embodiment, the assembly of the washers 3 with the indicator member 4 and the ring 5 is interposed under the bearing surface of the head portion of the bolt 1, while the assembly may also be interposed under the bearing surface of the nut 2 or under both bearing surfaces of the head portion of the bolt 1 and the nut 2.

Further, selection of shape and size for the openings 3D of the upper and lower washer portions 3A and 3B of the washers 3 makes it possible to adjust the size of the compressive area on the elastic synthetic resin ring 5 and preset the ring compression load required for breaking the ring 5 at the predetermined fastening pressure.

To sum up, in the illustrative embodiment, when the screw components are fastened in a state of being equipped with the elastic synthetic resin ring 5 interposed between the upper and lower washer portions 3A and 3B of the washers 3 that have a generally U-shaped lateral section and have been fitted under the bearing surface of the head portion of the bolt 1, the portion of the ring 5 interposed between the upper and lower plate portions 3A and 3B of the washers 3 is compressed to be lengthened radially in outward and inward directions. When the fastening pressure reaches the predetermined value, the lengthening of the ring 5 reaches the limit at the same time when the upper and lower washer portions 3A and 3B of the washers 3 overlap, and then the ring 5 is broken inwardly and outwardly by the upper and lower washer portions 3A and 3B. The inwardly broken piece 5C makes inroads into a gap between the shank of the screw components and the washers 3 and blocks the inlet portion of the gap. The outwardly broken piece 5B is torn off radially when the lengthening of the internal perimeter reaches the limit at the same time when the ring 5 is pushed out of the upper and lower washer portions 3A and 3B of the washer 3. The outwardly broken piece 5B is then in a state of being hooked on the external perimeter of the upper and lower washer portions 3A and 3B and can be removed with the fingers.

As the joint portion 3C of the upper and lower washer portions 3A and 3B of the washers 3 has been protruded beyond the bearing surface of the screw components, even when the upper and lower washer portions 3A and 3B overlap with each other as the result of fastening the screw components, a gap on the apex of the protruded joint portion 3C is left incompressed. As a result, the indicator member 4 fitted to the joint portion 3C maintains the initial condition of being fitted thereto without being broken. Consequently, a spot where the elastic synthetic resin ring 5 has been broken and hooked on the external perimeter of the upper and lower washer portions 3A and 3B as the result of compressing the washers 3 which have a generally U-shaped lateral section interposed under the bearing surface of the head portion of the screw components and overlapping of the upper and lower washer portions 3A and 3B or a spot where the indicator member 4 has been fitted thereto indicates completion of fastening.

Still further, a spot where the upper and lower washer portions 3A and 3B have not been overlapped due to failure of compressing the washers 3 interposed under the bearing surface of the head portion of the screw components even when the indicator member 4 has been fitted thereto or a spot where the elastic synthetic resin ring 5 has been left interposed between the upper and lower washer portions 3A and 3B even when the upper and lower washer portions 3A and 3B have overlapped with each other indicates insufficient fastening due to negligence or temporary fastening.

In addition, a spot where the indicator member 4 has not been fitted indicates a spot where the washers involved in the embodiment of the present invention were not used and this spot will be a checkpoint for periodical inspection.

Since an indicator for incomplete and complete fastening of screw components of the illustrative embodiment has the afore-mentioned structure, in the fastening work using screw components, for those screw components whose washers having a generally U-shaped lateral section interposed under the bearing surface of the head portion of the screw components have not been compressed and the upper and lower washer portions have not been overlapped or whose elastic synthetic resin ring has been left interposed between the upper and lower plate portions of the washers even when the upper and lower washer portions have been overlapped with each other, it is indicated that fastening has not been completed or insufficiently made. The outside diameter of the ring is larger than that of the head portion of the screw components for easy visual confirmation.

It is a simple matter to visually confirm that those screw components whose upper and lower washer portions having a generally U-shaped lateral section have been overlapped and whose elastic synthetic resin ring has been broken or separated have been fastened properly and completely at the predetermined pressure. When the screw components have been fastened at the predetermined pressure, the inwardly broken piece of the eslastic synthetic resin ring has made inroads into a gap between the shank of the screw components and the upper and lower washer portions, and as a result, airtightness and/or watertightness of the fastened portion of the screw components is maintained.

Because of the comparatively simple structure in which the washers having a generally U-shaped lateral section are interposed under the bearing surface of the head portion of the screw components which have the elastic synthetic resin ring interposed between the upper and lower washer portions and the indicator member fitted to the joint portion of the washers, a space in the axial extension (longitudinal direction) is not excessively occupied by the screw components. Thus, an apparatus for indicating incomplete and complete fastening of screw components can be obtained at lower cost.

In an application where screw components comprise a bolt and a nut and an elastic synthetic resin ring has been interposed between washers on the bolt side, when the bolt is rotated to be fastened with a tool while holding the nut with another tool to inhibit the relative rotation of the nut, the elastic synthetic resin ring in a state of being interposed between the upper and lower washer portions co-rotates with the bolt head. Consequently, the ring can be broken at the predetermined pressure without being twisted and with even distribution of fastening pressure on the entire perimeter.

In an application where washers with an elastic synthetic resin ring interposed therein are mounted on the nut side and then the nut is rotated to be fastened after the bolt is held so as not to be co-rotated, and in another application where washers with an elastic synthetic resin ring interposed therein are mounted on the pressure bolt, a similar effect can be obtained. Consequently, as there is no need to especially provide any engaging means for co-rotation of the elastic synthetic resin ring and the washers on the bearing surfaces of the bolt or the nut, the present invention may be applicable to conventional bolts and nuts.

Figure 9:
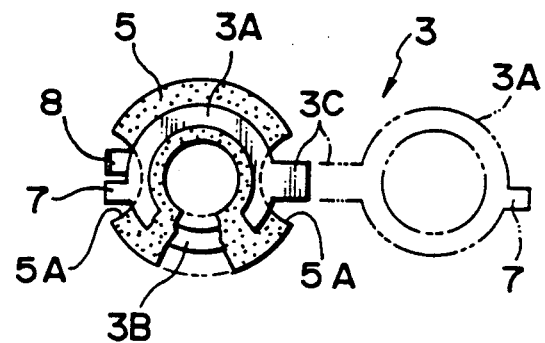
FIG. 9 is a front view illustrating an application of an assembly of the washers and the ring to be used for the embodiment.
Figure 10:
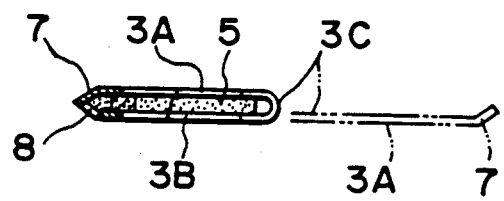
FIG. 10 is a lateral view illustrating the assembly of the washers and the ring shown in FIG. 9.

FIGS. 9–14 illustrate an alternative embodiment of the present invention. FIG. 9 is a front view illustrating an elastic synthetic resin ring having washers on both sides. FIG. 10 shows the lateral view of the elastic synthetic resin ring 5 with the washers 3 overlapped on both surface and back. In the figures, similar components or structural elements are designated by the same reference numerals, and redundant description will be avoided for simplicity.

In the illustrative embodiment of the present invention, the washers 3 have been formed integrally as a solid component. This solid assembly of a pair of washer portions 3A and 3B is used for the purpose of preventing both washer portions 3A and 3B from slipping out of the symmerical position due to friction caused by fastening the bolt 1 and the nut 2. The present invention will not be confined to the integrally assembled structure. In the illustration, however, the washers are made of sheet steel stamped out into a form of a pair of glasses. A part of the external perimeters of both washer portions 3A and 3B is joined with the joint 3C as shown with a chained line. The washers 3 are doubled up at the center of the joint portion 3C and the elastic synthetic resin ring 5 is interposed between the washer portions 3A and 3B.

On the location generally symmetrical to the external perimeter of the joint portion 3C, protrusion portions 7 and 8 are provided which are inwardly bent in confronting relationship with each other and are coincided with each other. The bending angle of the protrusion portions 7 and 8 is determined to be a degree of angle that at least the lateral sides of the apex of the protrusion portions 7 and 8 coincide with each other and the mutual contact of the protrusion portions 7 and 8 is not interfered at the time when the elastic synthetic resin ring 5 is broken with compression. The protrusion portions 7 and 8 may be bent under the developed condition as shown with a chained line in FIG. 10 or may be bent with a tool, such as a plier, after the elastic synthetic resin ring 5 has been inserted between both washer portions 3A and 3B. In addition, in order to facilitate bending of the joint portion 3C which joins both washer portions 3A and 3B and not to allow the joint portion 3C to be resistant against compression given at the time of fastening, notches are provided on both edges of the central part of the joint portion 3C, or weakened portions may be provided on the joint portion 3C by forming thinned portions thereon.

Figure 11:
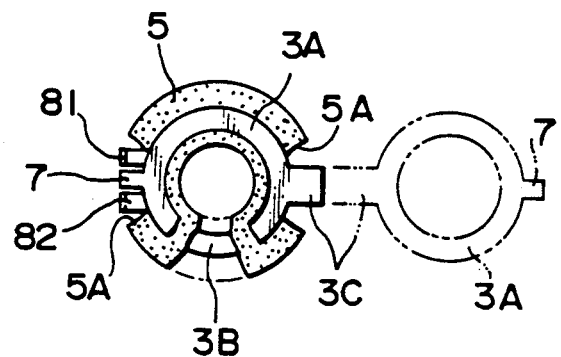
FIG. 11 is a view, similar to FIG. 9, illustrating an alternative application of the assembly of the washers and the ring.

The protrusion portions 7 and 8 will do if they at least coincide with each other toward the fastening direction of the bolt 1 and the nut 2. As shown in FIG. 11, however, when two protrusion portions 81 and 82 are formed perimetrically on one washer portion 3B, leaving a space between the protrusion portions so that the unitary protrusion portion 7 on the other washer portion 3A may come between both protrusion portions 81 and 82, the protrusion portions 7, 8 and 81, 82 coincide with each other whichever direction the bolt 1 and the nut 2 rotate.

In another application of structure having a pair of washer portions 3A and 3B integrally assembled therein, it may be good to double up a pair of washer portions stamped out with a press die into the form of a pair of glasses, insert an elastic synthetic resin ring between the doubled-up washer portions, bend the protrusion portions provided on the location symmetrical (both edge portions of a piece of material in the form of a pair of glasses) to the joint portion on the external perimeter of each washer portion in confronting relationship with each other or bend the protrusion portions into an L shape to butt both ends with each other or bend the protrusion portions into a Z shape to overlap the end surfaces of the protrusion portions, then braze, weld, or adhere the protrusion portions with an adhesive agent.

It may also be good to provide protrusion portions only on one washer portion, bend the protrusion portions in confronting relationship with each other or into an L shape to butt the apex of the protrusion portions against the external perimeter edge of the other washer portion or bend the protrusion portions into a lateral U shape or a Z shape to overlap the end surfaces of the protrusion portions on the external perimeter edge of the other washer portion, and then adhere the protrusion portions. It may further be advantageous to stamp out a pair of washer portions separately with a press die, lay the pair of washer portions on both surfaces of an elastic synthetic resin ring, provide protrusion portions bent into an L shape on the location diametrically symmetrical to the external perimeter edge of one washer portion, fit the protrusion portions in holes or notches provided on the location responding to the protrusion portions of the other washer portion, and then carry out brazing and other similar processes. Still it may be good to lay two identical washer portions, one having protrusion portions and the other having holes or notches on the locations diametrically symmetrical to the external perimeter of each washer portion, on the surface and the back of the elastic synthetic resin ring in the phase being mutually deviated by 180 degrees, coincide the protrusion portions with the holes or the notches on the other washer portion in confronting relationship with each other, and then fit the protrusion portions therein or adhere thereto.

For the elastic synthetic resin ring 5, it is simple and suitable to form notched portions 5A on a plurality of locations of the external perimeter of the ring 5, as shown in the illustration. In the illustration, the notched portions 5A also serve to escape from the joint portion 3C and the engaging protrusion portions 7 and 8 (81 and 82 for the illustration shown in FIG. 11). In addition, since the size and shape of bolt through-holes on the washer portions 3A and 3B have an effect on the compression value capable of breaking the elastic synthetic resin ring 5, it would be better to take quality of material, shape and thickness of the elastic synthetic resin ring 5 into consideration.

To sum up, proper designing of the material quality, elasticity, thickness and shape of the elastic synthetic resin ring 5 and the bearing surface area adjacent to the washer portions 3A and 3B will determine the destructive value for the elastic synthetic resin ring 5, that is, the fastening force of the bolt 1 and the nut 2.

Figure 12:
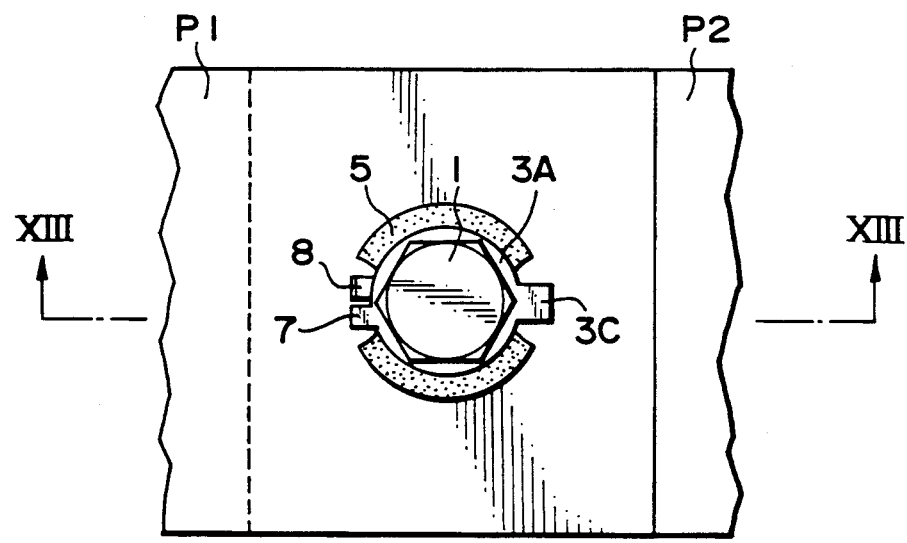
FIG. 12 is a front view, similar to FIG. 1, illustrating the apparatus for indicating incomplete and complete fastening of screw components loaded with the assembly of the washers and the ring shown in FIG. 9 prior to fastening.
Figure 13:
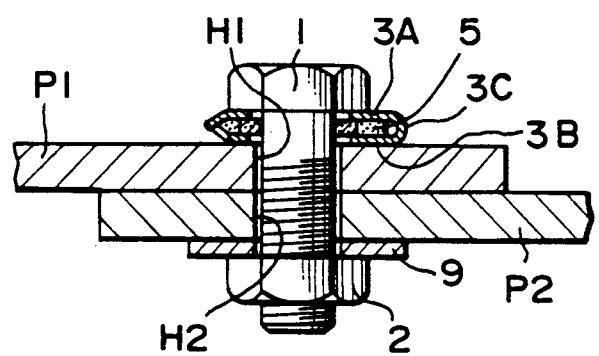
FIG. 13 is a lateral sectional view taken along alternate long and short dash line XIII—XIII of FIG. 12.
Figure 14:
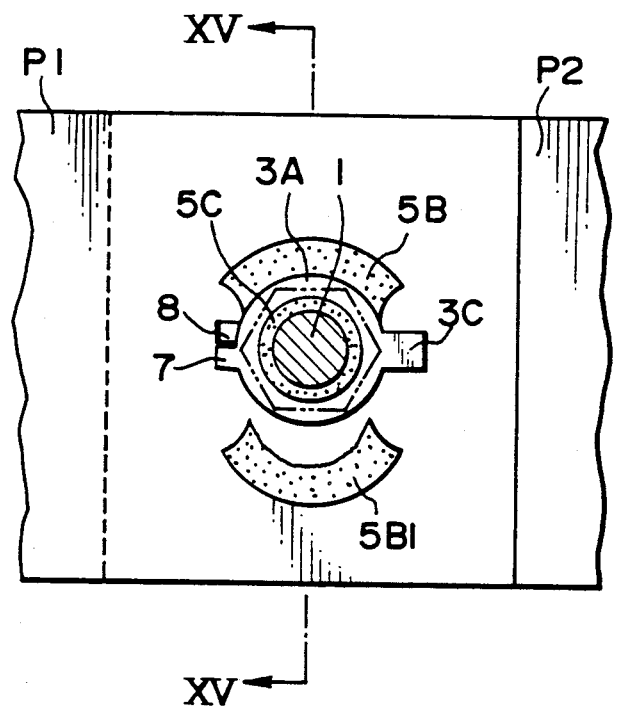
FIG. 14 is a front view, similar to FIG. 12, illustrating the embodiment shown in FIG. 12 after fastening has been completed.
Figure 15:
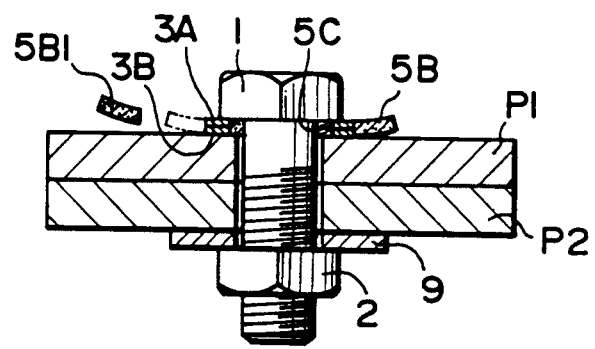
FIG. 15 is a vertical sectional view taken along alternate long and short dash line XV—XV of FIG. 14.

FIG. 13 shows a vertical sectional front view illustrating the embodiment of the present invention prior to fastening. FIG. 12 shows the plane figure of the embodiment, in which the bolt through-holes H1 and H2 of the piled-up boards P1 and P2 are coincided with each other and the bolt 1 having the elastic synthetic resin ring 5 with the washers 3A and 3B on both surfaces is interposed between the bearing surface of the bolt 1 and one board P1, and the nut is screwed on the bolt 1 through the washer 9.

As the nut 2 is increasingly fastened in the state as illustrated in FIGS. 12 and 13, the interposed portion of the elastic synthetic resin ring 5 between the washers 3A and 3B is compressed to be lengthened radially in inward and outward directions. When the fastening pressure of the bolt 1 and the nut 2 reaches the predetermined value, the elastic synthetic resin ring 5 is broken inwardly and outwardly on the compressed and lengthened portion, and the inwardly broken piece 5C (a ring shaped one) makes inroads into a gap between the shank of the bolt 1 and the hole edge of the washer portions 3A and 3B. In this way, the washer portions 3A and 3B are closely adhered with each other.

Simultaneously, the interposed portion of the outwardly broken piece 5B between the washer portions 3A and 3B is pushed outwardly, and subsequently the internal perimeter is lengthened to be torn off on the notched portions 5A. The torn-off outwardly broken piece 5B will be in a state of being hooked on the external perimeter of the washer portions 3A and 3B, or come off as indicated with the reference numeral 5B1. The hooked broken piece 5B can be removed with the fingers.

Figure 16:
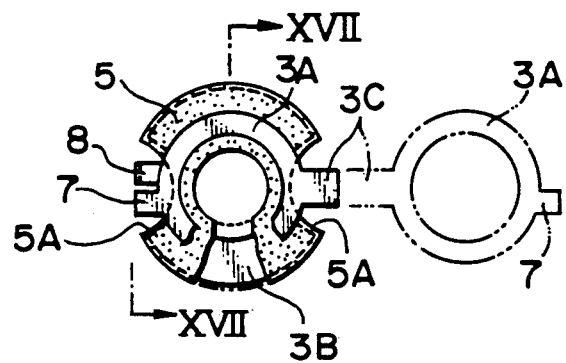
FIG. 16 is a front view, similar to FIG. 9, illustrating a further alternative application of the assembly of the washers and the ring.
Figure 17:
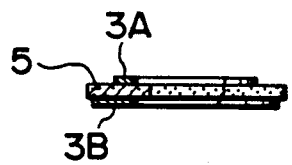
FIG. 17 is a lateral sectional view taken along arrowed line XVII—XVII, illustrating the assembly of the washers and the ring.

FIG. 16 is a front view illustrating an alternative embodiment of an elastic synthetic resin ring with washers on both surfaces. FIG. 17 shows the lateral view of that embodiment, in which the outside diameter of one washer portion 3B of the pair of washer portions 3A and 3B is formed to be larger than that of the other washer portion 3A and roughly equal to that of the elastic synthetic resin ring. At least the inside surface of the washer portion 3B having a larger diameter, that is, the surface behind the elastic synthetic resin ring 5, is coated with a color distinctly different from that of the ring 5, such as blue.

Figure 18:
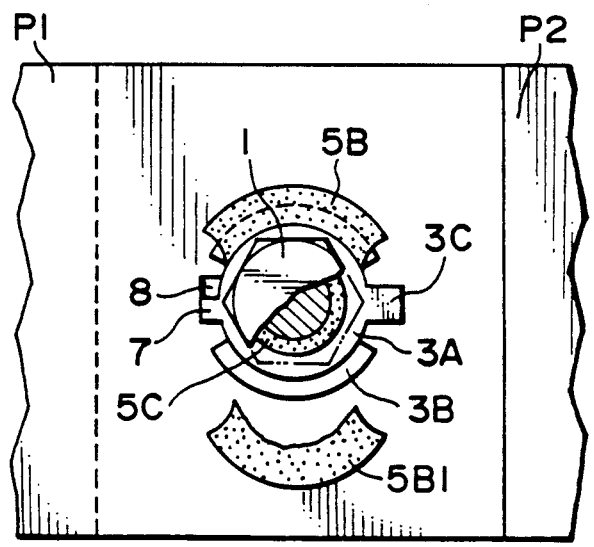
FIG. 18 is a front view, similar to FIG. 14, illustrating the embodiment of the apparatus for indicating incomplete and complete fastening of screw components loaded with the assembly of the washers and the ring shown in FIG. 16 after the fastening has been completed.

The elastic synthetic resin ring 5 having the washers on both surfaces in the illustrative embodiment is fitted on the bolt so as to position the washer portion 3B having a larger diameter on the rear side, that is, so as to face washer portion 3B to be adjacent to the board P1, then fastened with the bolt 1. When the elastic synthetic resin ring 5 is torn off and removed after the completion of fastening as shown in FIG. 18, then the external perimeter of the washer portion 3B coated with a color different from that of the elastic synthetic resin ring 5 and having a larger diameter will appear.

In the illustrative embodiment as mentioned above, the elastic synthetic resin ring 5 having the washers on both surfaces has been interposed under the bearing surface of the head portion of the bolt 1, while ring 5 may be interposed under the bearing surface of the nut 2 or under both bearing surfaces of the bolt 1 and the nut 2. Also, ring 5 may be interposed under the bearing surface of the head portion of the pressure bolt (a tap bolt).

In summary, in the illustrative embodiment, when the screw components which have the elastic synthetic resin ring having the washers on both surfaces and being interposed under the bearing surface of the head portion of the screw components are fastened, the interposed portion of the elastic synthetic resin ring between the washers is compressed and lengthened radially in inward and outward directions. When the fastening pressure reaches the predetermined value, the elastic synthetic resin ring reaches the limit of elongation, and as a result, the interposed portion of the elastic synthetic resin ring between the two washers is broken inwardly and outwardly. Simultaneously, the two washers adhere closely with each other.

The inwardly broken piece of the broken elastic synthetic resin ring makes inroads into a gap between the shank of the screw components and the hole edge of the washers to block the inlet portion of the gap. The outwardly broken piece of the ring is pushed out at least of the outside washer portion. At the same time the internal perimeter of the outwardly broken piece reaches the limit of elongation and is torn off radially. The torn-off piece drops out of the washers or becomes in a state of being hooked on the head portion of the screw components or the washers. The torn-off piece can be removed with the fingers.

Consequently, those places where the elastic synthetic resin ring interposed under the bearing surface of the head portion of the screw components has been broken and the outwardly broken piece has been removed from the screw components or the outwardly broken piece has been hooked on the external perimeter of the washers will indicate that fastening has been completed. Visual confirmation of the completion of fastening is easily made, since the external diameter of the elastic synthetic resin ring is larger than those of the head portion of the screw components and the washers.

In addition, in the illustrative embodiment where the outside diameter of one washer positioned on the rear side of the elastic synthetic resin ring has been formed to be larger than that of the other washer on the front side of the ring, the rear side washer appears. Thus, an indication of the completion of fastening will be clearly made with exposure of the rear side washer. Visual confirmation of the completion of fastening is easily made, since the rear side washer is larger than the front side washer.

Those places where the elastic synthetic resin ring having the washers on both surfaces and interposed under the bearing surface of the head portion of the screw components has not been compressed or the elastic synthetic resin ring has still been left inserted between the washers even after compression will indicate negligence of fastening or insufficient fastening due to temporary fastening.

It is needless to say that the illustrative embodiment shown in FIGS. 9-18 is also benefitted by other effects of the illustrative embodiment shown in and described with reference to FIGS. 1-8. While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. Apparatus for indicating incomplete fastening of screw components comprising:

a washer member comprising a generally flat sheet of material which has a first opening of a size sufficient for receiving the shank of screw components and preventing a nut and a head of said screw components from passing through the first opening; and a ring member comprising a generally flat synthetic resin sheet of material which has a second opening of a size sufficient for receiving the shank of screw components and preventing the nut and head of said screw components from passing through the second opening;

said washer member comprising:

a pair of washer portions each having a generally flat, round external shape whose outside diameter is at least equal to that of the head portion of the screw components and has a first opening formed almost on the center thereof; and a joint portion for jointing the pair of washer portions in confronting relationship with each other so that the first openings on each of the pair of washer portions may equally receive the shank of the screw components, said joint portion having a section substantially perpendicular to the axial extension of the shank of the screw components transforming into generally a U shape when the washer member receives the shank;

said ring member including a generally circular deformable material inserted between the pair of washer portions, the generally circular material having an outside diameter larger than that of either of the pair of washer portions;

said deformable material being lengthened radially when the first and second openings receive the shank of the screw components and the deformable material is compressed by the pair of washer portions due to fastening of said screw components, said deformable material being broken due to overlapping of the pair of washer portions when compression force substantially reaches a predetermined value.

2. Apparatus in accordance with claim 1, wherein said deformable material is an elastic body, and the size and shape of the first opening and the elasticity of the deformable material have been selected so that the deformable material can be broken when compression force reaches the predetermined value.

3. Apparatus in accordance with claim 1, wherein said ring member has a plurality of cuts formed on the perimeter of the generally circular material radially in an outward direction.

4. Apparatus in accordance with claim 3, wherein the cuts provided on said ring member have been formed so that the depth of the cuts in a radial direction of the circular material may at least reach the perimeter of either of the pair of washer portions.

5. Apparatus in accordance with claim 1, wherein said joint portion protrudes radially in an outward direction beyond the pair of washer portions, said apparatus further comprising an indicator member supported by said joint portion.

6. Apparatus in accordance with claim 1, wherein said pair of washer portions have diameters different from each other, said ring member having an outside diameter substantially larger than that of one of the pair of washer portions which has a smaller outside diameter.

7. Apparatus in accordance with claim 6, wherein said ring member has an outside diameter substantially equal to that of one of the pair of washer portions which has a larger outside diameter.

8. Apparatus in accordance with claim 6, wherein one washer portion having a larger outside diamter has a colored surface confronting with the other washer portion.

9. Apparatus in accordance with claim 8, wherein said ring member has a color distinctly different from the colored surface of said one washer portion.

10. Apparatus in accordance with claim 1, wherein at least one of the pair of washer portions includes engaging means provided on a position generally symmetrical to said joint portion with respect to the center of a circle thereof, said engaging means being interdigitated with the other washer portion to prevent both washer portions from co-rotating in the direction of the outermost perimeter of the circles thereof with the rotation of the screw components.

11. Apparatus in accordance with claim 10, wherein said engaging means comprise a plurality of protrusion portions formed on each of the pair of washer portions and interdigitated with each other.

12. Apparatus in accordance with claim 11, wherein said engaging means include:
- a first protrusion portion formed on one of the pair of washer portions; and
- a pair of second protrusion portions formed on the other of the pair of the washer portions isolatedly with each other;
- the first protrusion portion being interposed in a space between the second protrusion portions and engaged with the second protrusion portions.

* * * * *

UNITED STATES PATENT AND TRADEMARK OFFICE
CERTIFICATE OF CORRECTION

PATENT NO. : 4,988,246

DATED : January 29, 1991

INVENTOR(S) : Minoru YOSHIDA, et al

It is certified that error appears in the above-identified patent and that said Letters Patent is hereby corrected as shown below:

On the Title Page item [75];
Please change first name of the 11th Inventor from "Shigo" to --Singo--.

Signed and Sealed this

Fifteenth Day of September, 1992

Attest:

DOUGLAS B. COMER

*Attesting Officer*  *Acting Commissioner of Patents and Trademarks*